(12) United States Patent
Xu et al.

(10) Patent No.: US 8,411,827 B2
(45) Date of Patent: Apr. 2, 2013

(54) METHOD AND SYSTEM FOR IMPLEMENTING MULTIMEDIA RING BACK TONE SERVICE

(75) Inventors: Wentao Xu, Guangdong (CN); Xin Dai, Guangdong (CN); Ning Piao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 308 days.

(21) Appl. No.: 12/722,350

(22) Filed: Mar. 11, 2010

(65) Prior Publication Data

US 2010/0166156 A1 Jul. 1, 2010

Related U.S. Application Data

(63) Continuation of application No. PCT/CN2008/071958, filed on Aug. 12, 2008.

(30) Foreign Application Priority Data

Dec. 26, 2007 (CN) .......................... 2007 1 0305848

(51) Int. Cl.
*H04M 11/00* (2006.01)
(52) U.S. Cl. .................. 379/88.13; 379/88.12
(58) Field of Classification Search .................. 370/389, 370/230, 428, 351, 352, 401; 710/104, 105, 710/106, 107; 381/87; 379/88.12, 88.13, 379/375.01, 361
See application file for complete search history.

(56) References Cited

U.S. PATENT DOCUMENTS 6,321,383 B1   11/2001   Funahashi et al.
6,819,664 B1 *   11/2004   Jeong ........................... 370/352

(Continued)

FOREIGN PATENT DOCUMENTS

CN   1151559 A   6/1997
CN   1671159 A   9/2005

(Continued)

OTHER PUBLICATIONS

State Intellectual Property Office of the People's Republic of China, International Search Report in International Patent Application No. PCT/CN2008/071958 (Nov. 20, 2008).
Extended European Search Report in corresponding European Application No. 08783951.0 (Jan. 7, 2011).
Written Opinion of the International Searching Authority in corresponding PCT Application No. PCT/CN2008/071958 (Nov. 20, 2008).

(Continued)

*Primary Examiner* — Fan Tsang
*Assistant Examiner* — Eugene Zhao
(74) *Attorney, Agent, or Firm* — Leydig, Voit & Mayer, Ltd.

(57) ABSTRACT

Embodiments of the present invention disclose a method and system for implementing a multimedia ring back tone service. The method comprises: establishing a connection to a multimedia ring back tone platform when it is determined that either the calling party or the called party of a call is a user to the multimedia ring back tone service during call connection, and completing a media capability negotiation between a calling terminal and the multimedia ring back tone platform; acquiring a first media content and a second media content according to a multimedia ring back tone information of the user, and generating a streaming media from the first media content and the second media content; and playing the streaming media to the calling party. The present invention is capable of further improving existing multimedia ring back tone techniques to better meet the communication users' requirement for personalization.

13 Claims, 5 Drawing Sheets

U.S. PATENT DOCUMENTS

| | | | |
|---|---|---|---|
| 2007/0291776 A1* | 12/2007 | Kenrick et al. | 370/401 |
| 2007/0294425 A1 | 12/2007 | Sobti et al. | |
| 2008/0198976 A1 | 8/2008 | Zhang et al. | |
| 2009/0116624 A1 | 5/2009 | Xue | |
| 2009/0252153 A1* | 10/2009 | Choi et al. | 370/352 |

FOREIGN PATENT DOCUMENTS

| | | |
|---|---|---|
| CN | 101031097 A | 9/2007 |
| CN | 101072256 A1 | 11/2007 |
| CN | 101222673 A1 | 7/2008 |
| WO | WO 2005/069599 A2 | 7/2005 |
| WO | WO 2007/016270 A2 | 2/2007 |

OTHER PUBLICATIONS

State Intellectual Property Office of the People's Republic of China, First Office Action of Chinese Patent Application No. 200710305848.5 (Jan. 15, 2010).

Office Action in corresponding Korean Application No. 2010-7004030 (Jun. 15, 2011).

Office Action in corresponding Russian Patent Application No. 2010108529/08(012026) (Oct. 19, 2011).

* cited by examiner

METHOD AND SYSTEM FOR IMPLEMENTING MULTIMEDIA RING BACK TONE SERVICE

CROSS-REFERENCE TO RELATED APPLICATIONS

This application is a continuation of International Application No. PCT/CN2008/071958, filed on Aug. 12, 2008, which claims priority to Chinese Patent Application No. 200710305848.5 filed on Dec. 26, 2007, both of which are hereby incorporated by reference in their entireties.

FIELD OF THE INVENTION

This invention relates to the field of communication, and more particularly, to a method and system for implementing a multimedia ring back tone (MRBT) service.

BACKGROUND OF THE INVENTION

An MRBT service, which is for replacing the normal ring back tone service, is a user-customized service and provides the calling user with a beautiful and melodious multimedia video while the called user is alerted with ringing. After subscribing to such multimedia ring back tone service, a user may set the content of the MRBT at will, then a customized multimedia video can be played to the calling party when the user is alerted with ringing as a called party.

The current method for playing a video ring back tone and displaying text to the calling party is that, when service provider or operator prepares video files, they adds necessary text descriptions to the video files at one time. However, in this case, the text in the video files is static, and can not be modified dynamically as required by the user on his/her own initiative, which results in lack of flexibility in use and failure in meeting the changing requirement of the users.

SUMMARY OF THE INVENTION

Embodiments of the present invention provides a method and system for implementing an MRBT service, which further improve the existing multimedia ring back tone techniques and better meet the personalized requirements of users engaging in communication.

The embodiments of the present invention provide the technical solution as follows:

An embodiment of the present invention provides a method for implementing an MRBT service comprising: establishing a connection to an MRBT platform, and completing a media capability negotiation between a calling terminal and the MRBT platform, if a user of a call is determined to subscribe to an MRBT service in during call processing; acquiring a first media content and a second media content according to an MRBT information subscribed by the user, and generating a streaming media from the first media content and the second media content; and playing the streaming media to the calling terminal.

An embodiment of the invention further provides a system for implementing an MRBT service comprising: a media capability negotiating unit configured to conduct a media capability negotiation with a user terminal; a first media content acquiring unit configured to acquire a first media content according to an MRBT information of a user; a second media content acquiring unit configured to acquire a second media content according to the MRBT information of the user; a streaming media converting unit configured to generate a streaming media from the first media content and the second media content; and a playing unit configured to play the streaming media to a calling terminal.

The embodiments of the invention provide the following technical effects:

Embodiments of the invention advantageously improves the existing multimedia ring back tone techniques by allowing the existing multimedia ring back tone service to be more personalized and by increasing interactivity between users and the multimedia ring tone service. Users are enabled to configure and use the MRBT more flexibly, which makes the MRBT service more attractive and interesting to the users, and allows the user's personalized requirements to be met better.

BRIEF DESCRIPTION OF THE DRAWINGS

The embodiment of the present invention will be described in details below with reference to accompanying drawings, in which.

DETAILED DESCRIPTION OF THE EMBODIMENTS

Embodiments of the invention are directed to an improvement of the current multimedia ring back tone service for better meeting users' requirements for personalization, in which associated text or ring back tone of other media type is presented to the user while playing a video clip. The text or ring back tone may be explanation to the video clip itself Alternatively, the text or ring back tone may be message tailored for a caller by maker of the video clip. Embodiments of the invention allows the user to customize, on the basis of the customized multimedia ring back tone, other ring back tones which could be, for example, text, speech contents or video contents input or recorded by the user himself. The other ring back tones may either be customized as a second media content for the user, or may be configured to correspond to different first media contents which are the MRBTs. Before the MRBT is played, the first and the second media contents are synthesized to generate a streaming media. This makes it possible to incorporate the information, mood or greetings to be expressed by the user into an ordinary multimedia ring back tone in the shortest time. In such a way, the caller can enjoy a better audiovisual experience. In addition, the second media content may be customized differently for different time periods, different callers or different user groups. In accordance with the embodiments of the invention, the existing multimedia ring back tone technique is further improved in terms of personalization and interactivity between users and multimedia ring back tone service.

In the MRBT service according to an embodiment of the present invention, firstly, a user may additionally customize a second media content on the basis of the customization of a first media content which is multimedia ring back tone. The second media content is adapted to be synthesized with the first media content in a synchronized manner so as to generate a new multimedia ring back tone. The new multimedia ring back tone will be played to the caller in the call. The second media content may be configured such that it directly corresponds to the telephone number of a user, that is, the second media content corresponds to the information regarding the telephone number of the user. Such second media content is suitable to be superimposed on every single multimedia ring back tone customized by the user in a synchronized manner. Alternatively, the second media content may be configured such that it corresponds to a first media content customized by a user, that is, the second media content corresponds to the information regarding the first media content of the user. Such second media content is suitable to be superimposed on the corresponding multimedia ring back tone in the synchronized manner. In this manner, the user may have different information regarding the second media content to be configured with respect to different multimedia ring back tones. In this embodiment, the first media content represents the ordinary multimedia ring back tone which is commonly available nowadays. For example, it may be a video clip in this case. The second media content represents a text description, audio file, video file, flash and the like, which is configured on the basis of the customization of the first media content. The second media content may be text that is input by the user himself, speech contents or video contents recorded by the user, or text description, speech, video clip, etc., configured by other systems or third party user on behalf of the user. A colorful multimedia ring back tone formed by synthesizing the first media content and second media content could be played to a caller when he starts making a call.

In general, neither a user himself/herself nor other users or systems on behalf of the user could configure the second media content until the user has subscribed to the MRBT service, that is, a second media content can be customized at the time when a corresponding multimedia ring back tone service is subscribed by the user or by some other users or systems on behalf of the user. In other words, customization of the second media content has to be performed on the basis of the user's subscription to the first media content. By customizing the second media content, it means that a new streaming media will be generated by synthesizing the first and second media contents in implementing the MRBT service, which is then played to the caller. The configuration of the second media content may be realized in two different ways as below:

First Configuration

Upon receipt of a configuration request for customizing the first media content and the second media content simultaneously for a user, the first and second media contents, which are customized for the user, are received and then stored separately. Normally, the first media content is an MRBT. In such a case, the user of the MRBT is one who newly subscribed to the service and who customized the first and second media contents at the time of the subscription. The configuration of the second media content may be conducted in a way that it either corresponds to the telephone number of the user or corresponds to the first media content. That is, it is possible to configure the second media content to correspond to one user, or to configure the second media to correspond to some different first media contents of the same user respectively.

Second Configuration

Upon receipt of a configuration request for customizing the second media content for a user, it is necessary to determine whether the first media content customized for the user is stored, that is to say, it is determined whether the user has subscribed to the MRBT service. In case that the first media content customized for the user is stored (i.e., the user has subscribed to the MRBT service), the second media content, which is customized for the user, is received and stored. The customized second media content may be configured to correspond to the telephone number of the user, or may be configured to correspond to the first media content that has been customized earlier. In addition, the first media content configured to correspond to the user may be provided with several second media contents. Also, the second media content may be configured according to different possible callers or different time periods. The second configuration method is applicable to a situation in which the user, who is to be provided with a customized second media content, has subscribed to the ring back tone service. Under such circumstance, a second media content need to be customized for the user.

Figure 1:
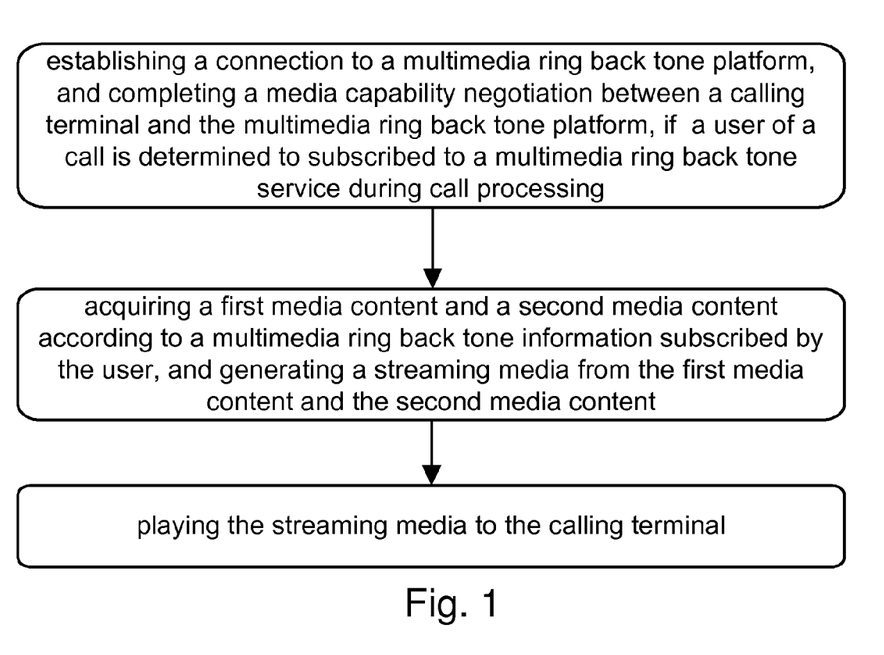
FIG. 1 is a flowchart illustrating the principle for implementing the method in accordance with an embodiment of the invention.

FIG. 1 is a flowchart showing the principle for implementing the method according to the embodiment of the invention. The process is illustrated as below:

Step 10: During a call connection, when it is determined that one of the two parties of the call has subscribed to the MRBT service, a connection to an MRBT platform is established, and a media capability negotiation is conducted between the calling terminal and the MRBT platform.

Specifically, when it is determined that either the calling party or the called party is an MRBT subscriber during call connection, the call is connected to the MRBT platform, and a media capability negotiation is conducted between the calling terminal and the MRBT platform to determine the media format supported by the calling terminal, so that an MRBT of the format supported by the calling terminal can be played to the calling terminal by the MRBT platform.

Step 20: The first and second media contents are acquired in accordance with the information on the subscribed multimedia ring back tone, and a streaming media is generated from the first and second media contents.

There are several different manners for acquiring the first and second media contents depending on the information regarding the subscribed multimedia ring back tone. One preferred way for implementing this will now be described in detail. The MRBT platform firstly acquires the user's first media content, which is usually an MRBT file, in accordance with the subscribed multimedia ring back tone information, acquires the second media content, which is usually a text description, in accordance with the configuration information of the MRBT file configured by the user, and then synthesizes the acquired multimedia ring back tone file and text description in a synchronized manner so that the video portion of the MRBT file and the text description can be synchronously superimposed to generate a streaming media, namely, a new multimedia ring back tone. Of course, other ways for acquiring the second media content and performing the synthesizing will also be covered by the embodiment of this invention. For example, the second media content may be acquired by referring to the information regarding subscribed multimedia ring back tone or by referring to the information regarding the second media content configured by the user to correspond to the telephone number of the user. In that case, the second media content may be a text description, or an audio file or a video file recorded by the user. The text description, audio file, video file, or flash segment will then be synthesized with the MRBT file to generate a streaming media. In this embodiment, the steaming media may be generated by performing a synchronous superposition of the first and second media contents, and may be played in real time to the caller. That is to say, in this embodiment of the invention, the streaming media may be played to the caller in real-time while the first and second media contents are converted into the streaming media.

In this embodiment, the first and second media content customized for the user may be stored in the following ways: a correspondence between a user ID and an ID of the first media content customized for the user may be stored in a first storage area, and a correspondence between the user ID and an ID of the second media content customized for the user may be stored in a second storage area; alternatively, the correspondence between the user ID and the ID of the first media content customized for the user may be stored in the first storage area, and a correspondence between the ID of the first media content customized for the user and an ID of the second media content configured to correspond to the first media content may be stored in the second storage area. Then, the first media content and the second media content with IDs are stored in an MRBT library and a second media content managing unit, respectively. The second media content managing unit may be a text description management library, or may be a ring back tone library or an MRBT library.

Step 30: The streaming media is played to the caller.

Figure 2:
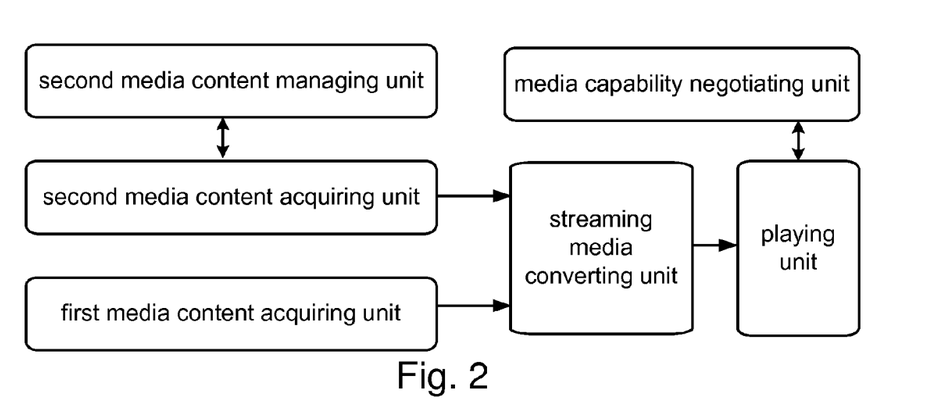
FIG. 2 is diagram schematically showing the configuration of the system in accordance with the embodiment of the invention.

The present invention provides a system for implementing the MRBT service, which implements the method provided by the above embodiment of the invention. In FIG. 2, illustrated is a schematic structure of the system, which comprises a media capability negotiation unit, a first media content acquiring unit, a second media content acquiring unit, a streaming media converting unit, and a playing unit. The functions provided by those units will be described in the following. The media capability negotiation unit is configured to perform media capability negotiation with the user terminal, in particular, performs media capability negotiation with the calling terminal and the called terminal respectively during the call connection. The first media content acquiring unit is configured to acquire the first media content, which may be an ordinary multimedia ring back tone file, according to the information regarding the user's multimedia ring back tone. The second media content acquiring unit is configured to acquire the second media content, which may be a text description, an audio file, a video file or a flash segment, according to the information regarding the user's ring back tone. The streaming media converting unit is configured to convert the acquired first and second media contents synchronously into a streaming media. The playing unit is configured to play the streaming media to the caller.

In this embodiment, the system for implementing the MRBT service may further comprise a second media content managing unit for storing the second media contents, and managing the text descriptions, audio files or video files corresponding to the MRBT file. With the second media content managing unit, users may flexibly add, delete, or modify the corresponding text description, audio or video file at will, and may provide flexible, changeable, and colorful multimedia ring back tone to the MRBT file. The second media content acquiring unit may also be configured to inquire the second media content managing unit of whether the user has customized the second media content; and if the user has customized the second media content, the second media content managing unit returns the second media content to the second media content acquiring unit.

The second media content managing unit may further comprise an inquiring subunit and a second media content storing subunit. The inquiring subunit is configured to determine, upon receipt of a request for customizing the second media content for the user, whether the user has customized the first media content. The second media content storing subunit is configured to receive and store, if it is determined that the user has customized the first media content, the second media content customized for the user, and store the user ID and the ID of the second media content correspondingly in the second storage area after the reception of the customized second media content, or alternatively store the ID of the first media content and the ID of the second media content correspondingly in the second storage area.

In case that the user is a called party, when the phone is ringing and before the phone is picked up, the first media content acquiring unit retrieves the corresponding ID of the first media content from the first storage area according to the ID of the user, and then retrieves the first media content from the MRBT library according to the retrieved ID of first media content. In general, the first media content may be a video file, and the ID of the first media content may be a code of the video file. Similarly, the second media content acquiring unit retrieves the ID of the second media content from the second storage area according to the user ID, and then retrieves the second media content from the second media content managing unit according to the acquired ID of the second media content. The streaming media converting unit may generate a streaming media from the first and second media contents, and then the generated streaming media may be played to the caller by the playing unit. In this embodiment, the streaming media may be generated by synchronously superimposing the first and second media contents, and the generated streaming media may be played to the caller in real time by the playing unit.

Figure 3:
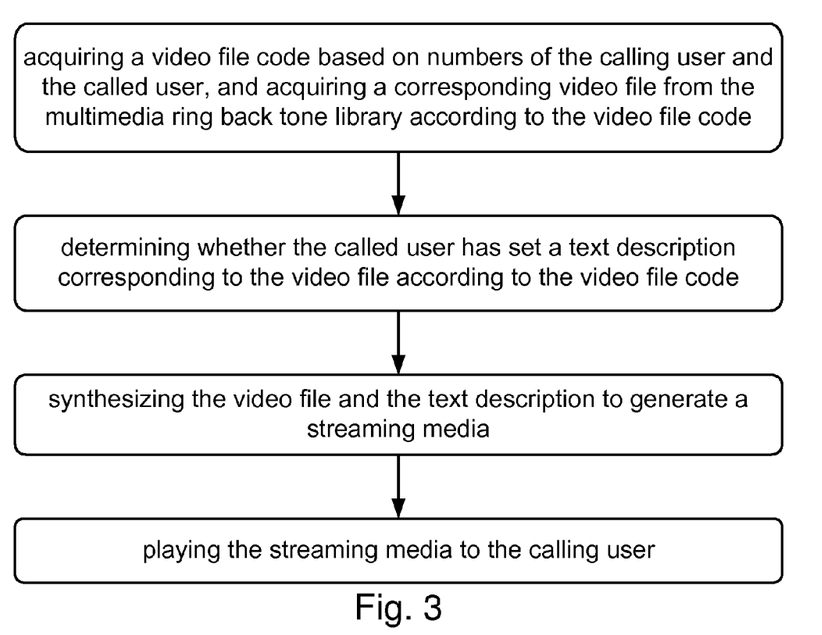
FIG. 3 is a flowchart illustrating the method for playing multimedia ring back tone in accordance with the embodiment of the invention.

A process of playing multimedia ring back tone by the MRBT platform will be described with reference to FIG. 3. In this embodiment, at the time a video call is made, the caller calls the callee, and the switching equipment triggers, if it is determined that the callee is idle and is a subscriber of the MRBT service, the call to the MRBT platform. According to the telephone numbers of the caller and the callee, the MRBT platform picks a video file code corresponding to the caller, acquires the corresponding video file from the MRBT library according to the video file code, and then determines whether the callee has configured a text description information corresponding to the video file according to the video code. If it is determined the video file is provided with a corresponding text description, the MRBT platform acquires the corresponding text description according to the video file code, performs a synchronous superposition of the video file and its corresponding text description to generate a new multimedia file, and plays the new multimedia file to the caller. Playing the MRBT in this way may improve the users' experience of the MRBT, and enables users to design different text descriptions for different callers at will. It makes the video clip more colorful and expands the applicability of the MRBT service. In addition, it makes the user keener to use the MRBT service, and improves the flexibility and convenience of the service.

Figure 4:
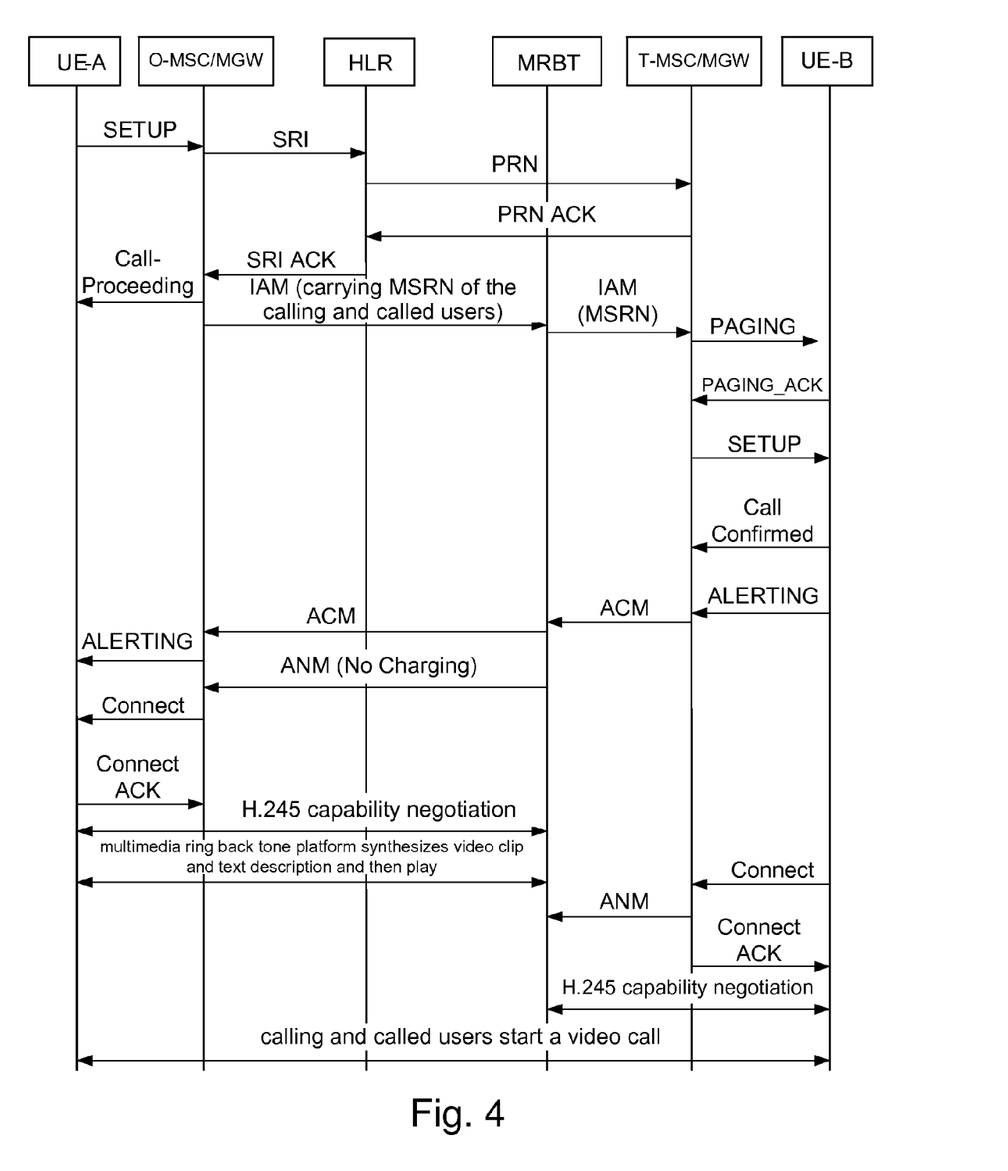
FIG. 4 is a flowchart illustrating the method for playing multimedia ring back tone in a CS domain network in accordance with the embodiment of the invention.

A process of playing multimedia ring back tone to a caller in a CS circuitry domain network will be described with reference to FIG. 4. A multimedia ring back tone (MRBT) platform provides functions of media capability negotiation and media conversion. MRBT platform interacts with a media gateway (MGW). ISDN user part (ISUP) signaling is applied between the MRBT platform and a mobile switching center (MSC). A caller initiates a video call to a callee, the originating mobile switching center (O-MSC) receives a SETUP initiation message from the caller. The O-MSC sends a Send_Routing_Information (SRI) to the home location register (HLR) of the callee to inquire about the routing information. HLR of the callee sends a PROVIDE_ROAMING_NUMBER (PRN) to the current terminating mobile switching center (T-MSC) of the caller to request roaming number information, and inquires about the mobile station roaming number (MSRN) of the callee. T-MSC allocates an MSRN to the user, and returns a PRN_ACK (Acknowledgement of PROVIDE_ROAMING_NUMBER) to HLR of the callee. HLR of the callee sends an SRI_ACK (Acknowledgement of Send_Routing_Information) to the O-MSC. If it is determined from the MRBT supporting information carried by the SRI signaling that the user is a subscriber of the MRBT, the SRI_ACK will carry MSRN and an MRBT SS_Code (supplementary service code). The O-MSC initiates a CALL_PROCEEDING to the calling terminal with the acquired MSRN of the callee. The O-MSC determines that the user is a subscriber of multimedia ring back tone service from the MBRT SS_Code, and sends an initial address message (IAM) to the MRBT platform. The MRBT platform sends the IAM to the T-MSC side according to MSRN. The T-MSC pages the callee. The called terminal responds to the paging from the T-MSC. The T-MSC sends the called terminal a SETUP message which carries bearer information elements supporting the playing of the MRBT. The callee returns a CALL CONFIRMED message without any new bearer information element, indicating the capability of supporting a Video Phone (VP) call. After T-MSC is successfully connected to the callee, the called terminal starts ringing and returns a ringing message back to the T-MSC. The T-MSC returns an Acknowledged Message (ACM) back to the MRBT side, wherein the user status is marked as idle in the ACM. The MRBT returns an ACM message carrying an instruction for playing the MRBT back to the O-MSC. The O-MSC sends an Alerting message to the caller.

Figure 5:
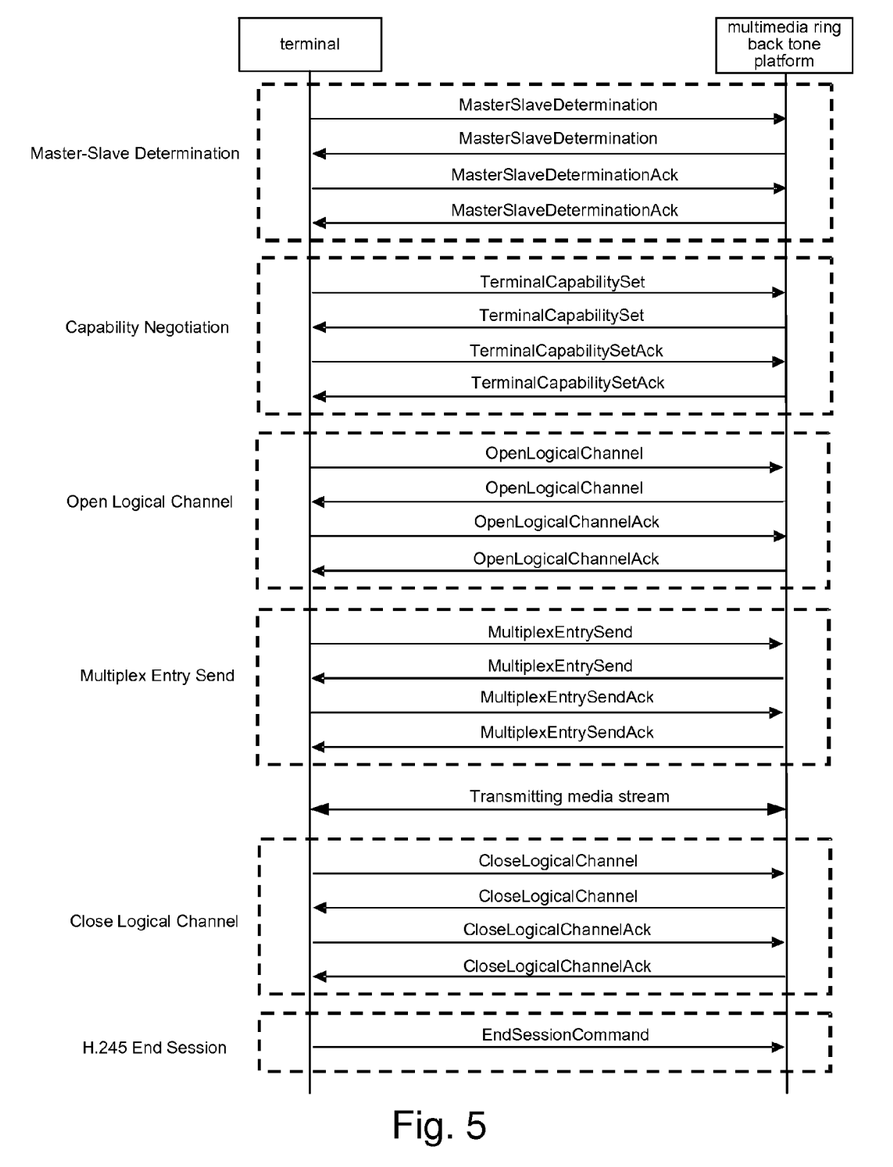
FIG. 5 is a flowchart schematically illustrating a H.245 negotiation process in accordance with the embodiment of the invention.

The MRBT sends an ANM (answer message) message (no charging) to the O-MSC. The O-MSC sends to the calling terminal a CONNECT message indicating H.245 negotiation. The calling terminal returns a Connect_ack back to the O-MSC. The calling terminal conducts a capability negotiation with the MRBT platform according to H.245 protocol to determine a media format that can be supported by both the calling terminal and the MRBT platform. To understand the process of negotiation between the calling terminal and the MRBT according to H.245 protocol, the flowchart illustrating a multimedia capability negotiation according to H.245 protocol shown in FIG. 5 may be referred to. This negotiation process is not only applicable to the media capability negotiation between the calling terminal and the MRBT platform, but also applicable to the multimedia capability negotiation between a pair of terminals, and between a terminal and a device. The media capability negotiation comprises the following processes:

Master-Slave Determination process: the calling terminal initiates a Master-Slave Determination process with the MRBT platform, in order to determine which endpoint device should be responsible (or play the principal role) for solving a conflict in case of protocol conflict occurred between the endpoint devices. Such Master-Slave Determination process and the capability negotiation process may be performed in arbitrary order, or may be performed simultaneously;

Terminal Capability Set process: the calling terminal initiates a capability negotiation process with the MRBT platform to determine a universal Terminal Capability Set. Such capability negotiation process and the Master-Slave Determination process may be performed in arbitrary order, or may be performed simultaneously;

Open Logical Channel process: the calling terminal and the MRBT platform open a logical channel. In H.245 protocol, media flow and data flow are transported in form of logical channels;

Multiplex Entry Send process: this process is necessary for the interaction with a 3G mobile phone. However, this process is not necessary for an H323 or SIP video phone.

The above four processes compose the media capability negotiation process between the calling terminal and the MRBT platform. Of course, in a CS circuitry domain network, the negotiation process will have to be transparently transmitted through MGW. The negotiation channel established according to H.245 protocol may be closed upon the completion of communication. The process of closing the negotiation channel includes: a process of closing logical channel (Close Logical Channel) and a process of sending an End Session Command to the counterpart to close the H.245 protocol channel.

After the completion of negotiation, the MRBT platform retrieves the MRBT file customized by the callee for the caller and the text description file paired with the retrieved multimedia ring back tone file, according to the telephone numbers of the callee and caller. The paired text description file could be acquired from the ring back tone library according to the MRBT file code and the telephone number of the caller. If the corresponding text description file exists in the library, the MRBT platform acquires the file, and synthesizes the MRBT file and the text description file to generate a new video file, the resultant video file is then played to the caller, the calling terminal is able to view the MRBT customized for it as well as the text description configured therefore. If no corresponding text description file is found, the MRBT platform directly plays the MRBT file to the user.

When the callee answers the call, the terminal of the callee sends a Connect message to the T-MSC, the T-MSC sends an ANM to MRBT side as an answering signaling. The T-MSC returns a Connect_ack message back to the callee. The MRBT platform sends an ANM to the O-MSC as an answering signaling. The O-MSC starts charging the caller. The terminal of the callee establishes a capability negotiation with the MRBT platform according to H.245 protocol, the MRBT platform stops playing the MRBT to the calling terminal, the audio-video channel is connected, the caller starts the video call with the callee.

This embodiment may also be applied to an MRBT scheme designed for IP Multimedia Subsystem (IMS) which supports IP multimedia service. IMS is configured to create, manage and terminate various types of multimedia services by applying a call control mechanism of session initiation protocol (SIP). According to the MRBT scheme of IMS network, in a case where the caller initiates a call through the IMS domain and the callee can answer the call, and if the callee is a subscriber to multimedia ring back tone service and subscribes to a ring back tone, the ring tone that is played to the caller will be replaced by the video ring back tone customized by the callee. With regard to multimedia ring back tones in IMS or CS circuitry domain, they are the same in that it is triggered to the MRBT platform by the core network, and a synthesis process is performed by the MRBT platform on the multimedia file and its text description, therefore detailed description will be omitted.

It should be understood by those ordinary skilled in this art that all or part of the processes described above may be implemented by instructing relevant hardware to operate in accordance with the embodiments of the invention with a program. The program may be embodied in a computer-readable storage medium including ROM/RAM, magnetic disc, optical disc, and the like.

In conclusion, the embodiments of the present invention can efficiently improve the existing multimedia ring back tone service, enabling users to view text message prepared for a video clip while viewing the video clip. The text may be an explanation to the video clip itself (similar to the TV subtitle). Alternatively, the text may be message information customized by the video producer for a caller. The first media content is not limited to video clip. For example, the first media content may be any multimedia contents, such as flash. The second media content may be a text description, audio file, video file or flash segment customized by the user or a third party. Thus, audio file, video file, flash and the like in addition to the text description, may be synthesized. Such dynamic synthesizing may significantly improve the user's experience in using multimedia ring back tone service. For example, the user will be able to pass his/her bless, greetings to a caller with the MRBT. While providing a calling subscriber with a better auditory perception, the MRBT service will also increase the income of the operator.

It will be apparent to those skilled in the art that various modifications and variations can be made to the present invention without departing from the spirit and scope of the invention. Thus, it is intended that the present invention cover modifications and variations of this invention provided they come within the scope of the appended claims and their equivalents.

The invention claimed is:

1. A method for implementing multimedia ring back tone (MRBT) service, comprising:
   determining whether a user has customized a first media content when a request for customizing a second media content for the user is received;
   receiving and storing the second media content customized for the user corresponding to the first media content if the user has customized the first media content;
   establishing a connection to an MRBT platform, and completing a media capability negotiation between a calling terminal and the multimedia ring back tone platform, if the user of a call is determined to subscribe to the MRBT service during call processing;
   acquiring, by the MRBT platform, the first media content according to the multimedia ring back tone information subscribed by the user;
   acquiring the second media content according to the first media content;
   generating a streaming media by synchronously superimposing the first media content and the second media content; and
   playing, by the MRBT platform, the streaming media to the calling terminal.

2. The method of claim 1, further comprising:
   determining whether the user has customized the second media content, before acquiring the second media content.

3. The method of claim 1, wherein the step of storing the second media content further comprises:
   storing a first correspondence between an ID of the user and an ID of the first media content customized for the user in a first storage area;
   storing a second correspondence between the ID of the user and an ID of the second media content customized for the user in a second storage area; and
   storing the first media content and the second media content with IDs respectively in a multimedia ring back tone library and a second media content managing unit.

4. The method of claim 3, wherein acquiring the first media content further comprises:
   retrieving a first media content ID corresponding to the ID of the user from the first storage area; and
   extracting the first media content corresponding to the first media content ID from the multimedia ring back tone library.

5. The method of claim 3, wherein acquiring the second media content further comprises:
   retrieving a second media content ID corresponding to the ID of the user from the second storage area; and
   extracting the second media content corresponding to the second media content ID from the second media managing unit.

6. The method of claim 1, wherein the second media content is at least one of a text message, a video clip, a flash segment and a piece of audio.

7. The method of claim 1, wherein the first media content is a video clip, the second media content is a text message, wherein generating the streaming media by synchronously superimposing the first media content and the second media content further comprises synthesizing the video clip and the text message to generate the streaming media.

8. The method of claim 1, wherein the streaming media is played to the calling terminal in real time.

9. A system for implementing a multimedia ring back tone service, comprising:
   a media capability negotiating unit configured to conduct a media capability negotiation with a user terminal;
   a first media content acquiring unit configured to acquire a first media content according to a multimedia ring back tone information of a user;
   a second media content acquiring unit configured to acquire a second media content according to the first media content;
   a second media content managing unit configured to store the second media content; wherein the second media content managing unit further comprises:
     an inquiring subunit configured to determine whether the user has customized the first media content when a request for customizing the second media content for the user is received; and
     a second media content storing subunit configured to receive and store the second media content customized for the user when it is determined that the user has customized the first media content;
   a streaming media converting unit configured to generate a streaming media by synchronously superimposing the first media content and the second media content; and
   a playing unit configured to play the streaming media to a calling terminal.

10. The system of claim 9, wherein the second media content acquiring unit is further configured to inquire the second media content managing unit for whether the user has customized the second media content;
   the second media content managing unit is configured to return the second media content to the second media content acquiring unit if the user has customized the second media content.

11. The system of claim 9, wherein the second media content storing subunit is further configured to store an ID of the user and an ID of the second media content correspondingly in a second storage area upon receipt of the second media content customized for the user.

12. The system of claim 9, wherein the first media content is a video clip, and the second media content is a text message;
the streaming media converting unit is configured to synthesize the video clip and the text message to generate the streaming media; and
the playing unit is configured to play the streaming media to the calling terminal in real time.

13. A non-transitory computer readable medium, comprising computer program codes, which, when executed by a computer unit, cause the computer unit to perform:
determining whether a user has customized a first media content when a request for customizing a second media content for the user is received;
receiving and storing the second media content customized for the user corresponding to the first media content if the user has customized the first media content;
establishing a connection to a multimedia ring back tone platform, and completing a media capability negotiation between a calling terminal and the multimedia ring back tone platform, if the user of a call is determined to subscribe to a multimedia ring back tone service during call processing;
acquiring the first media content according to the multimedia ring back tone information subscribed by the user;
acquiring the second media content according to the first media content; and
generating a streaming media by synchronously superimposing the first media content and the second media content; and
playing the streaming media to the calling terminal.

* * * * *

UNITED STATES PATENT AND TRADEMARK OFFICE
CERTIFICATE OF CORRECTION

PATENT NO. : 8,411,827 B2  
APPLICATION NO. : 12/722350  
DATED : April 2, 2013  
INVENTOR(S) : Xu et al.

Page 1 of 1

It is certified that error appears in the above-identified patent and that said Letters Patent is hereby corrected as shown below:

Title page, Item (75), inventors, city/country of residence for inventor Wentao Xu should read
-- Shenzhen (CN) --.

Title page, Item (75), inventors, city/country of residence for inventor Xin Dai should read
-- Shenzhen (CN) --.

Title page, Item (75), inventors, city/country of residence for inventor Ning Piao should read
-- Shenzhen (CN) --.

Signed and Sealed this
Eighteenth Day of June, 2013

Teresa Stanek Rea
*Acting Director of the United States Patent and Trademark Office*